United States Patent
Benisty (10) Patent No.: US 12,282,657 B2
(45) Date of Patent: Apr. 22, 2025

(54) DYNAMIC AND SHARED CMB AND HMB ALLOCATION

(71) Applicant: Western Digital Technologies, Inc., San Jose, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 157 days.

(21) Appl. No.: 17/949,132

(22) Filed: Sep. 20, 2022

(65) Prior Publication Data
US 2024/0094911 A1    Mar. 21, 2024

(51) Int. Cl.
*G06F 3/06* (2006.01)

(52) U.S. Cl.
CPC .......... *G06F 3/0611* (2013.01); *G06F 3/0656* (2013.01); *G06F 3/0679* (2013.01)

(58) Field of Classification Search
CPC ..... G06F 3/0611; G06F 3/0656; G06F 3/0679
See application file for complete search history.

(56) References Cited

U.S. PATENT DOCUMENTS

| 11,036,425 B2 | 6/2021 | Lee et al. |
| 2019/0065102 A1 | 2/2019 | Shin et al. |
| 2019/0171392 A1 | 6/2019 | Kim et al. |
| 2020/0098423 A1* | 3/2020 | Huang ................. G11C 11/419 |
| 2020/0257638 A1 | 8/2020 | Maroney et al. |
| 2020/0293676 A1 | 9/2020 | Hara |
| 2021/0286623 A1 | 9/2021 | Navon et al. |
| 2021/0382648 A1 | 12/2021 | Kanno et al. |
| 2022/0050770 A1 | 2/2022 | Das Purkayastha et al. |
| 2023/0107227 A1* | 4/2023 | Tan ..................... G06F 12/0246 711/154 |
| 2023/0130233 A1* | 4/2023 | Nam ..................... G06F 12/121 711/154 |
| 2023/0147882 A1* | 5/2023 | Lee ....................... G06F 3/0604 711/154 |

FOREIGN PATENT DOCUMENTS

| CN | 109871337 A | 6/2019 |
| KR | 20190093361 A | 8/2019 |

* cited by examiner

*Primary Examiner* — Zhuo H Li
(74) *Attorney, Agent, or Firm* — PATTERSON + SHERIDAN, LLP (57) ABSTRACT

A data storage device includes a controller. The controller includes a controller memory buffer (CMB). The controller is configured to associate both the CMB and a host memory buffer (HMB) of a host device as a single buffer pool with a plurality of CMB buffers and a plurality of HMB buffers. The controller is further configured to allocate either a CMB buffer or a HMB buffer based on a tradeoff between latency and performance between using the CMB or using the HMB to store data. By leveraging the benefits of both the CMB and the HMB to store data, the overall performance of the data storage device may be improved.

15 Claims, 5 Drawing Sheets

DYNAMIC AND SHARED CMB AND HMB ALLOCATION

BACKGROUND OF THE DISCLOSURE

Field of the Disclosure

Embodiments of the present disclosure generally relate to data storage devices, such as solid state drives (SSDs), and, more specifically, leveraging capabilities of both a host memory buffer (HMB) and a controller memory buffer (CMB) in a storage system.

Description of the Related Art

Enterprise SSDs may have specific requirements in order to integrate into data center environments, which may include predictability and short latencies for read operations. Additionally, enterprise workloads typically have no locality, and reads from any part of a logical address range are expected to be serviced, by the relevant data storage device, with a same level of quality of service (QoS). Due to the requirements for enterprise SSDs, logical to physical (L2P) tables may generally be stored in dynamic random access memory (DRAM), which may require additional or greater sizes of DRAM.

With additional or greater sizes of DRAM, a cost to produce the data storage device may be negatively impacted. Furthermore, enterprise SSDs are consumable products. A data storage device may be rated based on a number of device writes per day (DWPD) for the lifetime of the data storage device. A customer may choose to exceed the DWPD for a data storage device, which may wear the data storage device out faster. In other words, the cost of the data storage device translates into a certain number of write cycles.

Host devices may include a host memory buffer (HMB) for use by the data storage device, which may be used to store data normally stored in the DRAM of the data storage device. In some data storage devices, the DRAM may not be present, such that the HMB may be used in lieu of the DRAM. Furthermore, a controller of the data storage device may include a controller memory buffer (CMB), where the host device may be able to access the CMB to place submission queues, completion queues, physical region page (PRP) lists, scatter gather list (SGL) segments, data buffers, and the like. The CMB feature may reduce the number of memory-read operations issued over the transfer link between the data storage device and the host device, which may reduce latency of the computing system. The CMB and the HMB each have different benefits that are not leveraged against each other.

Therefore, there is a need in the art for an improved data storage device operation leveraging the benefits of both the controller memory buffer and the host memory buffer.

SUMMARY OF THE DISCLOSURE

The present disclosure generally relates to data storage devices, such as solid state drives (SSDs), and, more specifically, leveraging capabilities of both a host memory buffer (HMB) and a controller memory buffer (CMB) in a storage system. A data storage device includes a controller. The controller includes a CMB. The controller is configured to associate both the CMB and a HMB of a host device as a single buffer pool with a plurality of CMB buffers and a plurality of HMB buffers. The controller is further configured to allocate either a CMB buffer or a HMB buffer based on a tradeoff between latency and performance between using the CMB or using the HMB to store data. By leveraging the benefits of both the CMB and the HMB to store data, the overall performance of the data storage device may be improved.

In one embodiment, a data storage device includes a controller. The controller includes a controller memory buffer (CMB). The controller is configured to issue a write command to write data to a host memory buffer (HMB) of a host device, determine whether a utilization of the CMB is greater than or equal to a threshold utilization, allocate a buffer of the CMB when the utilization of the CMB is less than the threshold utilization, and issue a write command to the CMB to cache the write data in the CMB.

In another embodiment, a data storage device includes a controller. The controller includes a controller memory buffer (CMB) and a CMB-host memory buffer (HMB) scheduler. The CMB-HMB scheduler is configured to associate both the CMB and an HMB of a host device as a single buffer pool, where the single buffer pool includes a plurality of CMB buffers and a plurality of HMB buffers, and allocate either a CMB buffer from the plurality of CMB buffers or an HMB buffer from plurality of HMB buffers, where the allocating is based on a tradeoff between latency and performance between using the CMB or using the HMB to store data.

In another embodiment, a storage system includes a data storage device configured to be coupled to a host device having a host memory buffer (HMB). The data storage device includes a controller. The controller includes a controller memory buffer (CMB). The storage system further includes means for associating both the CMB and the HMB as a single buffer pool, where the single buffer pool includes a plurality of CMB buffers and a plurality of HMB buffers, and means for allocating either a CMB buffer from the plurality of CMB buffers or an HMB buffer from plurality of HMB buffers, where the allocating is based on a tradeoff between latency and performance between using the CMB or using the HMB to store data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, leveraging capabilities of both a host memory buffer (HMB) and a controller memory buffer (CMB) in a storage system. A data storage device includes a controller. The controller includes a CMB. The controller is configured to associate both the CMB and a HMB of a host device as a single buffer pool with a plurality of CMB buffers and a plurality of HMB buffers. The controller is further configured to allocate either a CMB buffer or a HMB buffer based on a tradeoff between latency and performance between using the CMB or using the HMB to store data. By leveraging the benefits of both the CMB and the HMB to store data, the overall performance of the data storage device may be improved.

Figure 1:
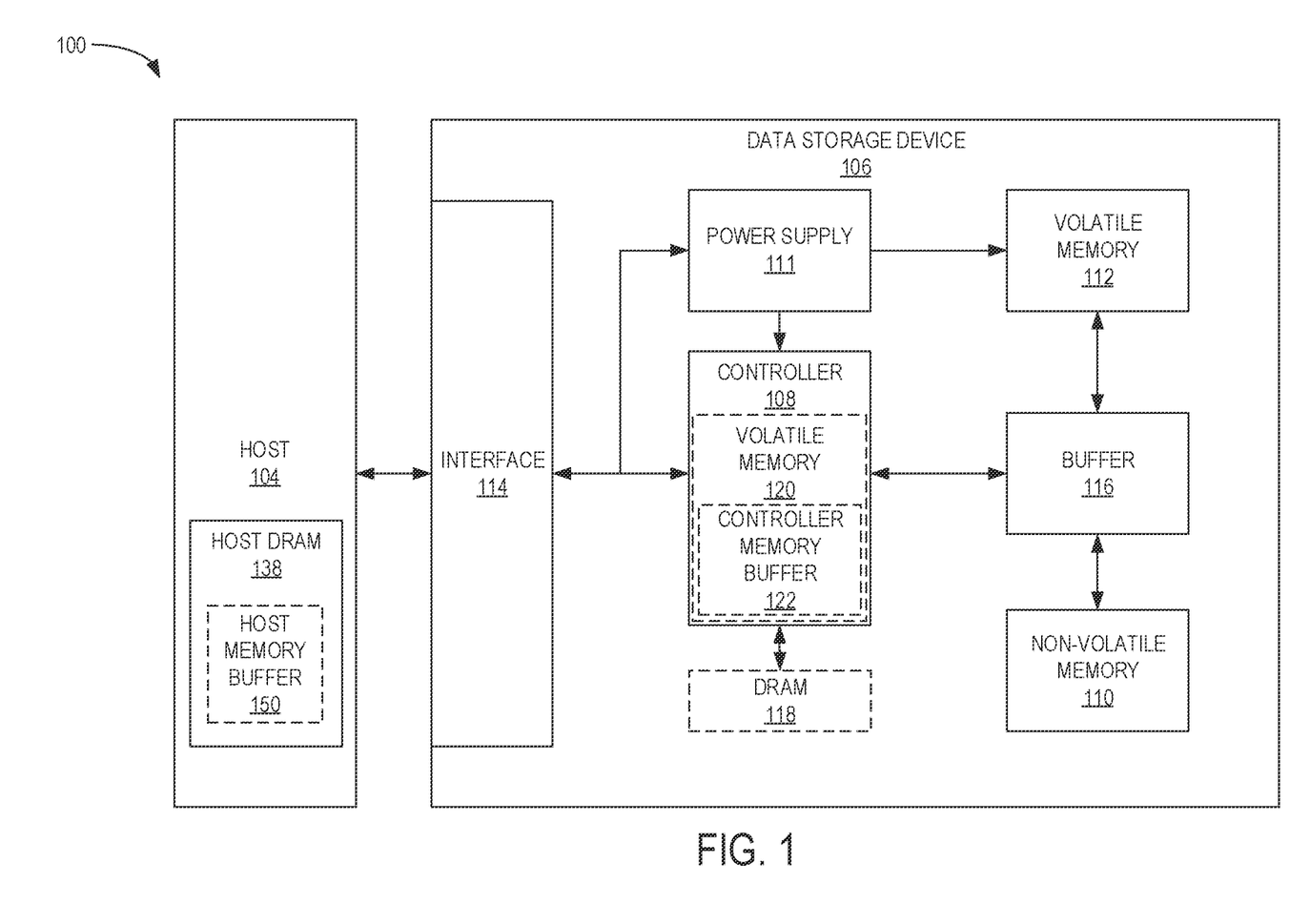
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
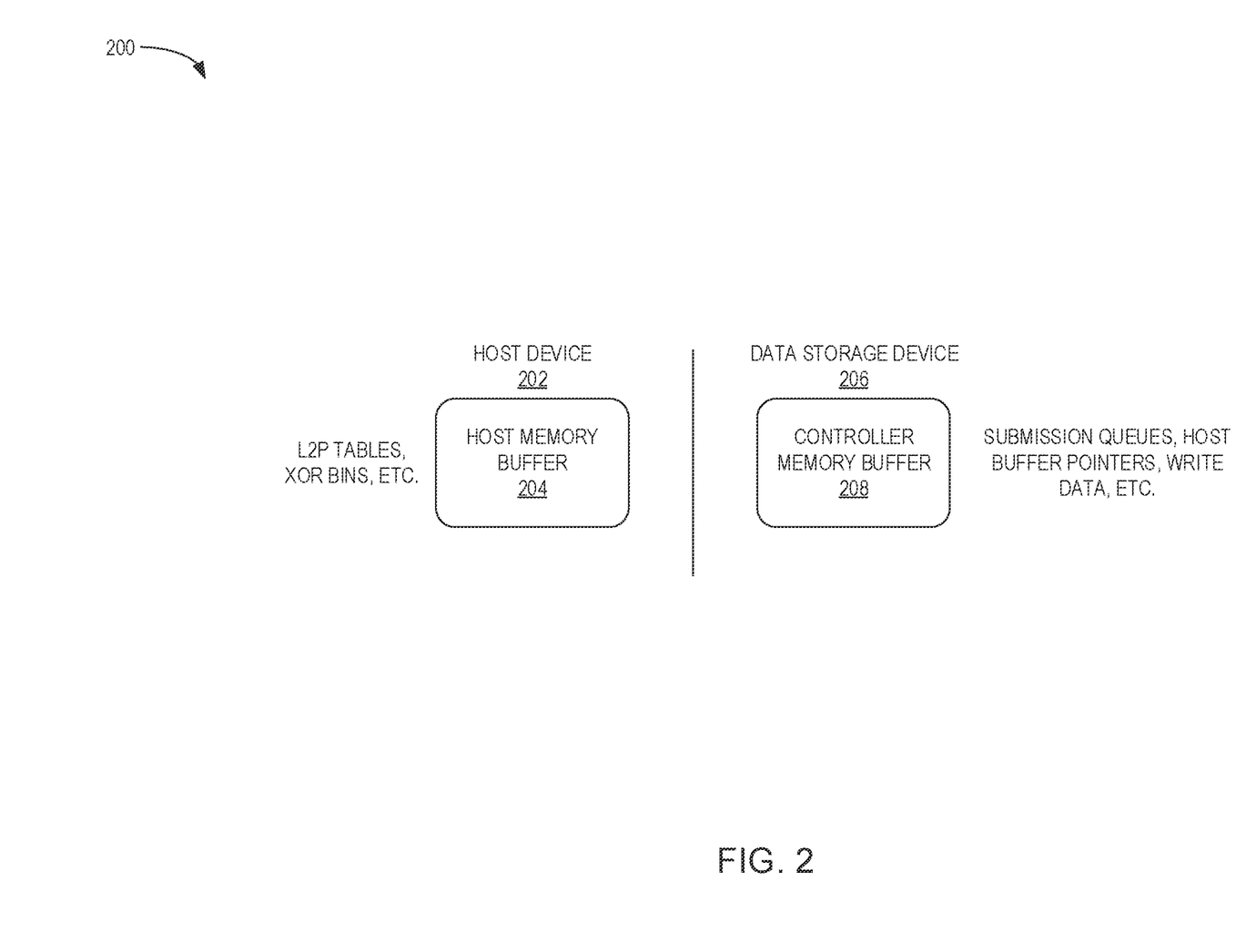
FIG. 2 is an exemplary illustration of a storage system comprising a host device having a host memory buffer (HMB) and a data storage device having a controller memory buffer (CMB), according to certain embodiments.

FIG. 2 is an exemplary illustration of a storage system 200 comprising a host device 202 having a HMB 204 and a data storage device 206 having a CMB 208, according to certain embodiments. The HMB 204 stores address tables, mapping tables, logical to physical (L2P) tables, exclusive or (XOR) bins, and the like. The CMB 208 may store submission queues, completion queues, physical region page (PRP) lists, scatter gather list (SGL) segments, data buffers, pointers, and the like. The latency of accessing the CMB 208 by the data storage device 206 or, more specifically, a controller, such as the controller 108 of FIG. 1, may be less than the latency of accessing the HMB 204 by the data storage device 206 or the controller 108. Table 1 below shows, for exemplary purposes, pros and cons of using either the CMB 208 or the HMB 204.

TABLE 1

|  | HMB | CMB |
| --- | --- | --- |
| Latency (data storage device access) | High | Low |
| Capacity (DRAM-less data storage device) | High | Low |
| Overhead (security and protection) | Yes | No |
| Extra PCIe Traffic | Yes | No |

An access latency by the data storage device 206 to the HMB 204 is greater than the access latency by the data storage device 206 the CMB 208. Because accessing the CMB 208 by the data storage device 206 does not add traffic on a PCIe bus between host device 202 and the data storage device 206, latency of accessing the CMB 208 may be less than the latency of accessing the HMB. Furthermore, because data is not being transferred between the host device 202 and the data storage device 206, additional overhead may not be needed. Likewise, when the data storage device 206 is DRAM-less, the capacity of the HMB 204 may be greater than the capacity of the CMB 208. Thus, for performance purposes, the CMB 208 may be utilized to store and retrieve data instead of using the HMB 204. However, if capacity is a consideration, the HMB 204 may be utilized to store and retrieve data instead of using the CMB 208. In other words, the data storage device 206 may determine a tradeoff between one or more of a latency consideration, a performance consideration, and a capacity consideration in choosing to store data in either the HMB 204 or the CMB 208.

It is to be understood that the HMB 204 may be a plurality of HMBs. It is to be further understood that the CMB 208 may be a plurality of CMBs. Likewise, a controller, such as the controller 108 of FIG. 1, may associate the HMB 204 and the CMB 208 as a single pool of buffers, such that the single pool of buffers includes both the plurality of HMBs and the plurality of CMBs, where either a CMB buffer or an HMB buffer is allocated depending on the tradeoff described above. Furthermore, the controller 108 may dynamically determine where to store data based on an access frequency of the data or a hint associated with the data. In other words, if the data is hot (e.g., accessed equal to or greater than about 50% of the time), then the data may be stored in the CMB 208. Otherwise, if the data is cold (e.g., accessed less than about 50% of the time), then the data may be stored in the HMB 204. The controller 108 may dynamically move data from the HMB 204 to the CMB 208 or from the CMB 208 to the HMB 204 based on the access frequency of the data. Likewise, the controller 108 may determine to cache the data in either the HMB 204 or the CMB 208 based on previous access requests for similar data, which may be in the same logical block address (LBA) range, data type, and the like.

Figure 3A:
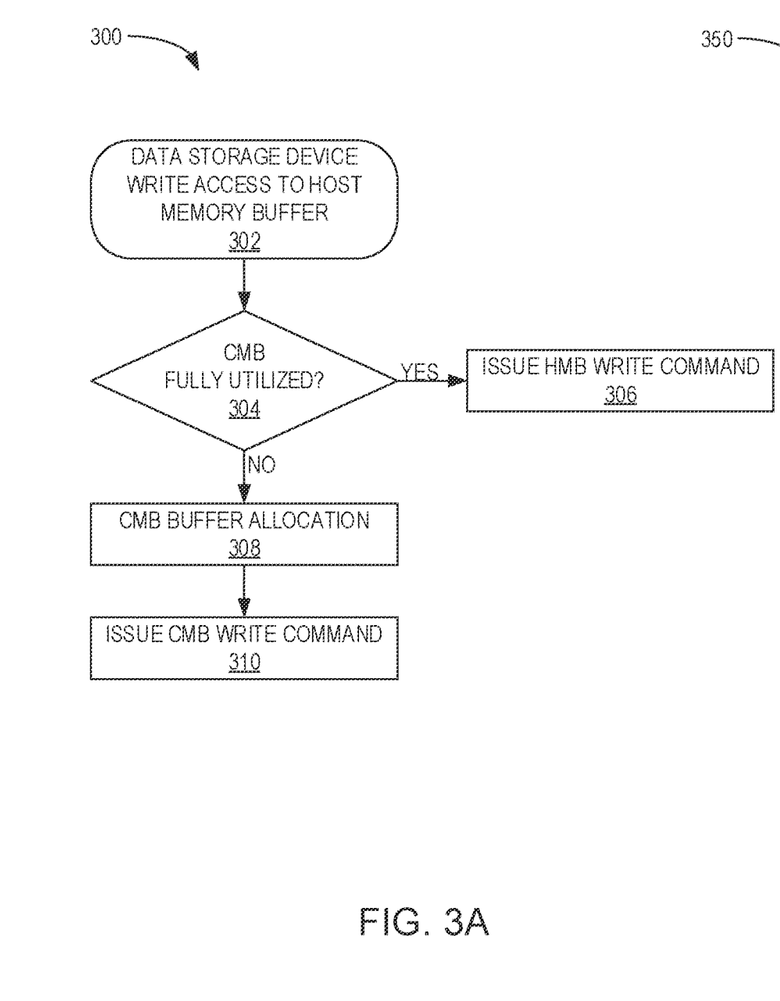
FIG. 3A is a flow diagram illustrating a method of performing a write access of a data storage device to an HMB of a host device, according to certain embodiments.

FIG. 3A is a flow diagram illustrating a method 300 of performing a write access of a data storage device to an HMB of a host device, according to certain embodiments. Method 300 may be implemented by a controller, such as the controller 108 of FIG. 1, having a CMB, such as the CMB 208 of FIG. 2. For exemplary purposes, aspects of the storage system 100 of FIG. 1 and the storage system 200 of FIG. 2 may be referenced herein.

At block 302, the data storage device 206 initiates a write access to write data to the HMB 204. At block 304, the controller 108 determines whether the CMB 208 is fully utilized. It is to be understood that fully utilized may refer to equal to or greater than a threshold utilization of the CMB 208. For example, the threshold utilization of the CMB 208 may be a size less that the total capacity of the CMB 208. If the CMB 208 is fully utilized, such that the utilization of the CMB 208 is equal to or greater than the threshold utilization, at block 304, then the controller 108 issues an HMB write command to write the data to the HMB 204. However, if the CMB is not fully utilized, such that the utilization of the CMB 208 is less than the threshold utilization, at block 304, then the controller 108 allocates a CMB buffer at block 308. The CMB buffer allocated may be from a single buffer pool having both one or more CMB buffers and one or more HMB buffers. At block 310, the controller 108 issues a CMB write command to write the data to the CMB 208. Thus, the controller 108 may issue a CMB write command instead of an HMB write command when the CMB is not yet fully utilized even when a write access to the HMB is requested.

Figure 3B:
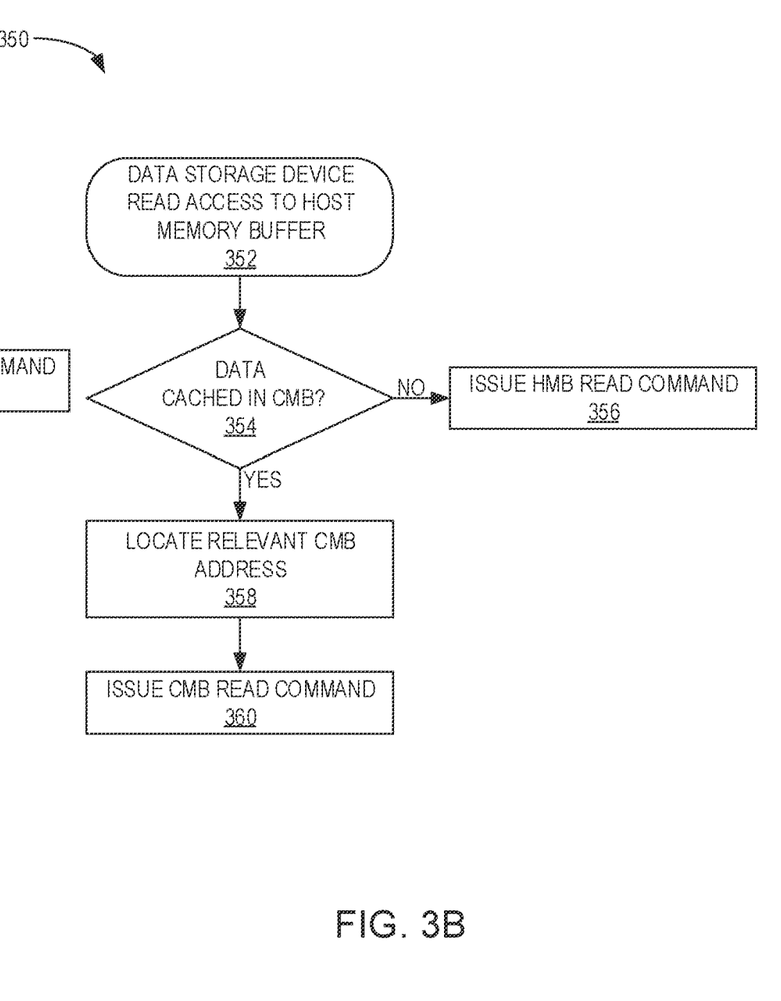
FIG. 3B is a flow diagram illustrating a method of performing a read access of a data storage device to an HMB of a host device, according to certain embodiments.

FIG. 3B is a flow diagram illustrating a method 350 of performing a read access of a data storage device to an HMB of a host device, according to certain embodiments. Method 350 may be implemented by a controller, such as the controller 108 of FIG. 1, having a CMB, such as the CMB 208 of FIG. 2. For exemplary purposes, aspects of the storage system 100 of FIG. 1 and the storage system 200 of FIG. 2 may be referenced herein.

At block 352, the data storage device 206 initiates a read access to read data from the HMB 204. At block 354, the controller 108 determines whether the data associated with the read accessed is cached in the CMB 208. If the data is not cached in the CMB 208 at block 354, then the controller 108 issues an HMB read command to read the relevant data associated with the read access from the HMB 204 at block 356. However, if the data is cached in the CMB 208 at block 354, then the controller 108 locates the relevant CMB address at block 358. At block 360, the controller 108 issues a CMB read command to read the data from the relevant CMB address.

Figure 4:
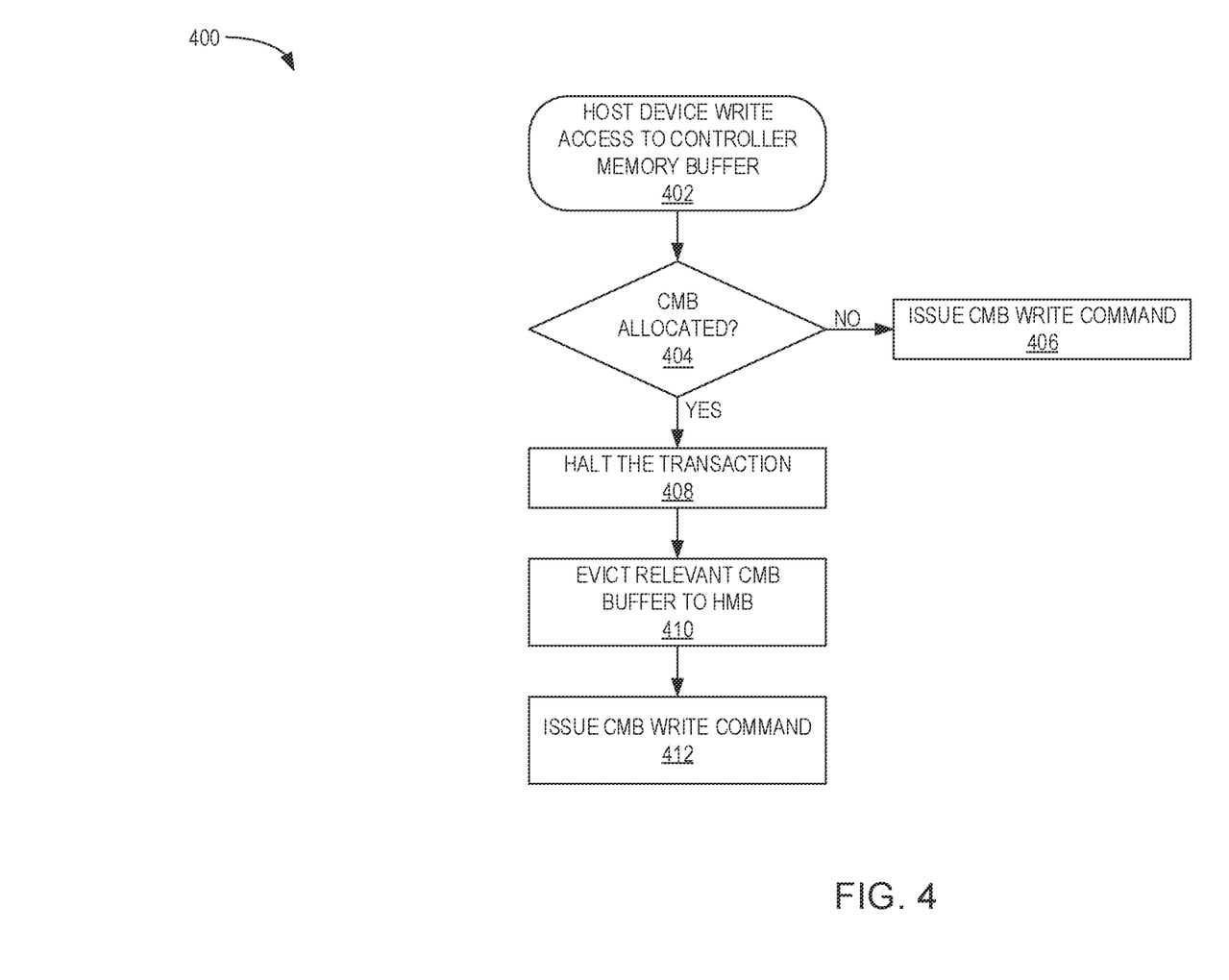
FIG. 4 is a flow diagram illustrating a method of performing a write access of a host device to a CMB of a data storage device, according to certain embodiments.

FIG. 4 is a flow diagram illustrating a method 400 of performing a write access of a host device to a CMB of a data storage device, according to certain embodiments. Method 400 may be implemented by a controller, such as the controller 108 of FIG. 1, having a CMB, such as the CMB 208 of FIG. 2. For exemplary purposes, aspects of the storage system 100 of FIG. 1 and the storage system 200 of FIG. 2 may be referenced herein.

At block 402, the host device 202 initiates a write access to write data to the CMB 208. At block 404, the controller 108 determines if the CMB 208 or relevant CMB buffer of the plurality of CMB buffers of the CMB 208 is allocated for the data storage device 106. In other words, the controller 108 may determine whether at least a portion of the CMB 208 is being utilized to store/cache data for the data storage device 106. When at least a portion of the CMB 208 is being utilized to store/cache data for the data storage device 106, the data may need to be evicted to the HMB 204 before host data may be stored in the CMB 208. If the CMB 208 or the relevant CMB buffer is not allocated for the data storage device 106 at block 404, then the controller 108 issues a CMB write command to write the data associated with the write access to the CMB 208 at block 406. However, if the CMB 208 or the relevant CMB buffer is allocated for the data storage device 106 at block 404, then the controller 108 halts the transaction (i.e., halts the write access) at block 408.

At block 410, the controller 108 evicts the relevant one or more CMB buffers or the CMB 208 from the controller 108 to the HMB 204. For example, the relevant one or more CMB buffers evicted may be associated with data originally scheduled to be programmed to the HMB 204, but was programmed to the CMB 208 instead based on the tradeoff between latency, performance, and capacity. At block 412, the controller 108 issues a CMB write command to write the data associated with the write access to the CMB 208. The issuing of the CMB write command may also include resuming or re-initiating the halted transaction that was halted at block 408.

Figure 5:
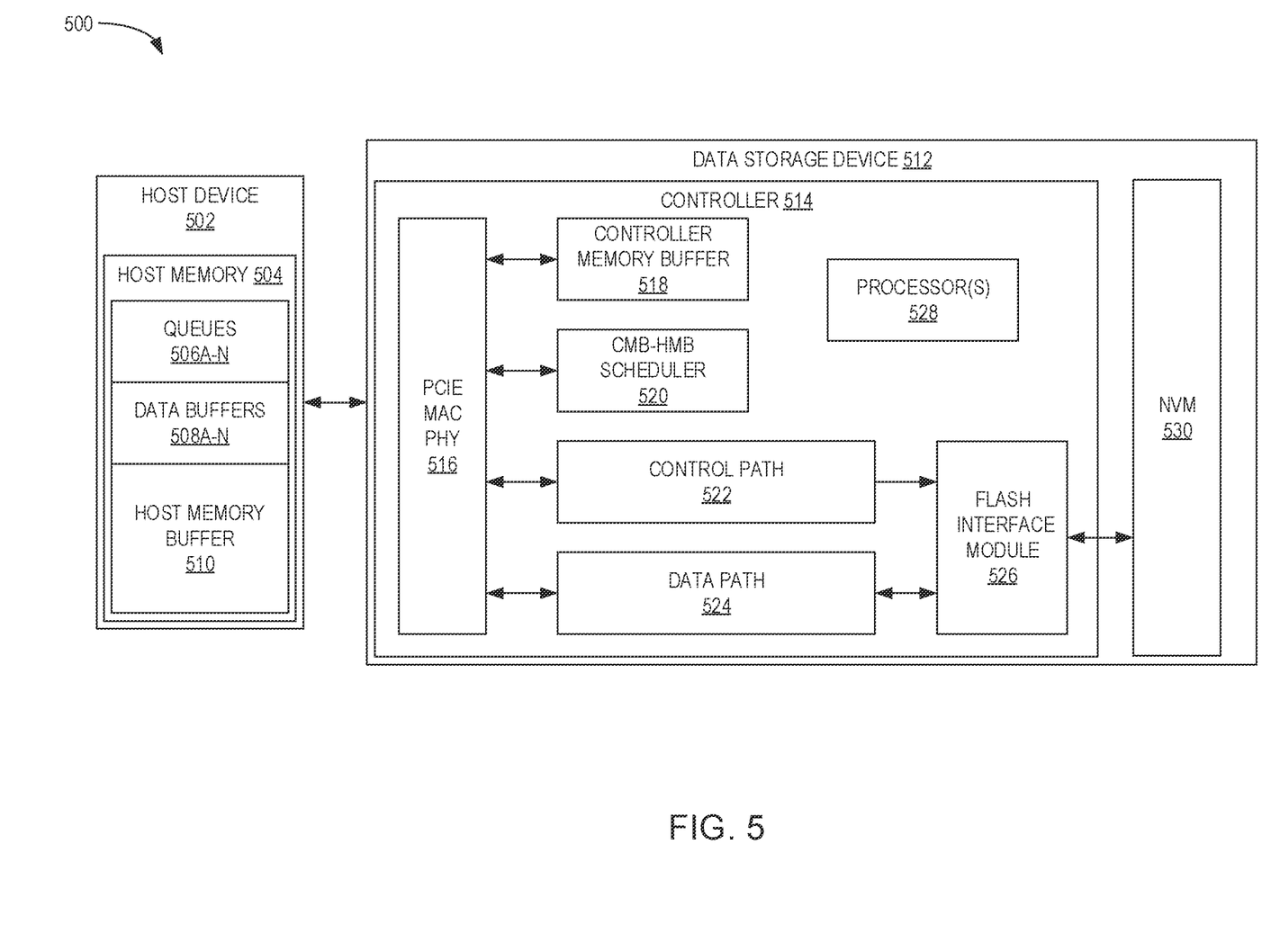
FIG. 5 is a schematic block diagram illustrating a storage system in which a controller of a data storage device may leverage benefits of a CMB and an HMB of a host device, according to certain embodiments.

FIG. 5 is a schematic block diagram illustrating a storage system 500 in which a controller 514 of a data storage device 512 may leverage benefits of a CMB 518 and an HMB 510 of a host device 502, according to certain embodiments. The host device 502 includes a host memory 504. The host memory 504 includes a plurality of queues 506A-N, which may be a plurality of submission queues and/or a plurality of completion queues, a plurality of data buffers 508A-N, and the HMB 510. The host device 502 is coupled to the data storage device 512.

The data storage device 512 includes the controller 514 and an NVM 530. The controller 514 includes a PCIe/media access layer (MAC)/physical layer (PHY) 516 coupled to a CMB 518, a CMB-HMB scheduler 520, a control path 522, and a data path 524. The controller 514 further includes a flash interface module (FIM) 526 coupled to the control path 522 and the data path 524. The controller 514 further includes one or more processors 528.

The controller 514 receives data from and sends data to the host device 502 via the PCIe/MAC/PHY 516, where the control path 522 may generate the respective commands to process the data. For example, the control path 522 may generate the read and write commands to read data from the NVM 530 in response to receiving a read command from the host device 502 or write data to the NVM 530 in response to receiving a write command from the host device 502. Likewise, the data path 524 may process the data received from either the host device 502 or the NVM 530. For example, the data path 524 may include direct memory access (DMA), error correction code (ECC) engines, encoders, decoders, encryption modules, decryption modules, and the like.

Furthermore, the host device 502 may store at least a portion of the plurality of queues 506A-N and at least a portion of the data buffers 508A-N in the CMB 518. In other words, the controller 514 may grant direct access to the host device 502 to store write commands, read commands, and data associated with the write commands and the read commands in the CMB 518. The CMB-HMB scheduler 520 may be configured to dynamically allocate either the HMB 510 (or an HMB buffer of a plurality of HMB buffers) or the CMB 518 (or a CMB buffer of a plurality of CMB buffers) to store relevant data that would be stored in either the CMB 518 or the HMB 510. The allocation may be based on a tradeoff between one or more of capacity, latency, and performance of storing the data in the CMB 518 or storing the data in the HMB 510. The CMB-HMB scheduler 520 may also be responsible for performing methods 300, 350, and 400 of FIGS. 3A, 3B, and 4, respectively. Likewise, the CMB-HMB scheduler 520 may be configured to manage the CMB 518 and the HMB 510. For example, the CMB-HMB scheduler 520 may be configured to evict data from the CMB 518 to the HMB 510 or move hot data from the HMB 510 to the CMB 518 and cold data from the CMB 518 to the HMB 510.

By leveraging the pros or benefits of both the CMB and the HMB, performance and quality of service of a data storage device may be improved.

In one embodiment, a data storage device includes a controller. The controller includes a controller memory buffer (CMB). The controller is configured to issue a write command to write data to a host memory buffer (HMB) of a host device, determine whether a utilization of the CMB is greater than or equal to a threshold utilization, allocate a buffer of the CMB when the utilization of the CMB is less than the threshold utilization, and issue a write command to the CMB to cache the write data in the CMB.

The write data is not programmed to the HMB. The controller is further configured to issue a read command to read the write data from the HMB, determine whether the write data is cached in the CMB, find a CMB address of the write data when the write data is cached in the CMB, and issue a read command to the CMB to read the write data from the CMB. The write data is not read from the HMB. The data storage device does not include dynamic random access memory (DRAM). The controller further includes a CMB/HMB scheduler. The CMB/HMB scheduler is configured to dynamically allocate either a buffer of the CMB or a buffer of the HMB based on at least one of a latency of accessing either the CMB or the HMB and an availability of capacity of either the CMB or the HMB. The CMB/HMB scheduler is further configured to manage an address translation of the CMB and the HMB and an eviction of data from either the HMB to the CMB or the CMB to the HMB.

In another embodiment, a data storage device includes a controller. The controller includes a controller memory buffer (CMB) and a CMB-host memory buffer (HMB) scheduler. The CMB-HMB scheduler is configured to associate both the CMB and an HMB of a host device as a single buffer pool, where the single buffer pool includes a plurality of CMB buffers and a plurality of HMB buffers, and allocate either a CMB buffer from the plurality of CMB buffers or an HMB buffer from plurality of HMB buffers, where the allocating is based on a tradeoff between latency and performance between using the CMB or using the HMB to store data.

The CMB-HMB scheduler is further configured to determine that an access request to write data to the HMB has been initiated, determine whether a utilization of the CMB is less than a utilization threshold, allocate the CMB buffer for the access request when the utilization of the CMB is less than the utilization threshold, and issue a CMB write command to write the data to the CMB instead of the HMB. The CMB-HMB scheduler is further configured to determine that the utilization of the CMB is greater than or equal to the utilization threshold and issue an HMB write command to write the data to the HMB. The CMB-HMB scheduler is further configured to determine that an access request to read data from the HMB has been initiated, determine whether the data is cached in the CMB buffer, locate a CMB address of the CMB buffer associated with the data when the data is cached in the CMB buffer, and issue a CMB read command to read the data using the CMB address from the CMB instead of the HMB. The CMB-HMB scheduler is further configured to determine that the data is not cached in the CMB buffer and issue an HMB read command to read the data from the HMB. The CMB-HMB scheduler is further configured to receive a write command to write data to the CMB from the host device, determine whether at least a portion of the CMB buffer has been allocated to cache data by the controller, and halt the write to the CMB when the at least a portion of the CMB buffer has been allocated to cache data by the controller. The CMB-HMB scheduler is further configured to evict at least a portion of the data cached in the CMB to the HMB buffer. The CMB-HMB scheduler is further configured to issue a CMB write command to program the write data to the CMB when the at least a portion of the write data cached in the CMB is evicted to the HMB buffer. The at least a portion of data cached in the CMB is associated with a HMB write command that was programmed to the CMB instead of the HMB. The CMB-HMB scheduler is further configured to determine that the at least a portion of the CMB buffer has not been allocated to cache data by the controller and issue a CMB write command to program the write data to the CMB. The CMB-HMB scheduler is further configured to move data stored in the CMB to the HMB or data stored in the HMB to the CMB based on an access frequency of the data stored in the CMB or the data stored in the HMB.

In another embodiment, a storage system includes a data storage device configured to be coupled to a host device having a host memory buffer (HMB). The data storage device includes a controller. The controller includes a controller memory buffer (CMB). The storage system further includes means for associating both the CMB and the HMB as a single buffer pool, where the single buffer pool includes a plurality of CMB buffers and a plurality of HMB buffers, and means for allocating either a CMB buffer from the plurality of CMB buffers or an HMB buffer from plurality of HMB buffers, where the allocating is based on a tradeoff between latency and performance between using the CMB or using the HMB to store data. The controller further includes means redirecting a write command to write data to the HMB to the CMB based on the means for allocating While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a controller, wherein the controller comprises a controller memory buffer (CMB) and a CMB-host memory buffer (HMB) scheduler, and wherein the CMB-HMB scheduler is configured to:
associate both the CMB and an HMB of a host device as a single buffer pool, wherein the single buffer pool comprises a plurality of CMB buffers and a plurality of HMB buffers;
allocate either a CMB buffer from the plurality of CMB buffers or an HMB buffer from the plurality of HMB buffers, wherein the allocating is based on a tradeoff between latency and performance between using the CMB or using the HMB to store data;
determine that an access request to write data to the HMB has been initiated;
determine whether a utilization of the CMB is less than a utilization threshold;
allocate the CMB buffer for the access request when the utilization of the CMB is less than the utilization threshold; and
issue a CMB write command to write the data to the CMB instead of the HMB.

2. The data storage device of claim 1, wherein the CMB-HMB scheduler is further configured to:
determine that the utilization of the CMB is greater than or equal to the utilization threshold; and
issue an HMB write command to write the data to the HMB.

3. The data storage device of claim 1, wherein the CMB-HMB scheduler is further configured to:
determine that an access request to read data from the HMB has been initiated;
determine whether the data is cached in the CMB buffer;
locate a CMB address of the CMB buffer associated with the data when the data is cached in the CMB buffer; and
issue a CMB read command to read the data using the CMB address from the CMB instead of the HMB.

4. The data storage device of claim 3, wherein the CMB-HMB scheduler is further configured to:
determine that the data is not cached in the CMB buffer; and
issue an HMB read command to read the data from the HMB.

5. The data storage device of claim 1, wherein the CMB-HMB scheduler is further configured to:
receive a write command to write data to the CMB from the host device;
determine whether at least a portion of the CMB buffer has been allocated to cache data by the controller; and
halt the write to the CMB when the at least the portion of the CMB buffer has been allocated to cache data by the controller.

6. The data storage device of claim 5, wherein the CMB-HMB scheduler is further configured to evict at least a portion of the data cached in the CMB to the HMB buffer.

7. The data storage device of claim 6, wherein the CMB-HMB scheduler is further configured to issue a CMB write command to program the write data to the CMB when the at least a portion of the write data cached in the CMB is evicted to the HMB buffer.

8. The data storage device of claim 6, wherein the at least a portion of data cached in the CMB is associated with a HMB write command that was programmed to the CMB instead of the HMB.

9. The data storage device of claim 5, wherein the CMB-HMB scheduler is further configured to:
determine that the at least a portion of the CMB buffer has not been allocated to cache data by the controller; and
issue a CMB write command to program the write data to the CMB.

10. The data storage device of claim 1, wherein the CMB-HMB scheduler is further configured to move data stored in the CMB to the HMB or data stored in the HMB to the CMB based on an access frequency of the data stored in the CMB or the data stored in the HMB.

11. The data storage device of claim 1, wherein the data storage device does not include dynamic random access memory (DRAM).

12. The data storage device of claim 1, wherein the allocating of either the CMB buffer from the plurality of CMB buffers or the HMB buffer from the plurality of HMB buffers is further based on an availability of capacity of either the CMB or the HMB.

13. The data storage device of claim 12, wherein the CMB-HMB scheduler is further configured to manage an address translation of the CMB and the HMB.

14. A storage system, comprising:
a data storage device configured to be coupled to a host device having a host memory buffer (HMB), wherein the data storage device comprises a controller, and wherein the controller comprises a controller memory buffer (CMB);

means for associating both the CMB and the HMB as a single buffer pool, wherein the single buffer pool comprises a plurality of CMB buffers and a plurality of HMB buffers; and means for allocating either a CMB buffer from the plurality of CMB buffers or an HMB buffer from the plurality of HMB buffers, wherein the allocating is based on a tradeoff between latency and performance between using the CMB or using the HMB to store data, the means for associating and the means for allocating are configured to:

determine that an access request to write data to the HMB has been initiated;

determine whether a utilization of the CMB is less than a utilization threshold;

allocate the CMB buffer for the access request when the utilization of the CMB is less than the utilization threshold; and issue a CMB write command to write the data to the CMB instead of the HMB.

15. The storage system of claim 14, further comprising:
means for redirecting a write command to write data to the HMB to the CMB based on the means for allocating.

* * * * *